Figure 1:
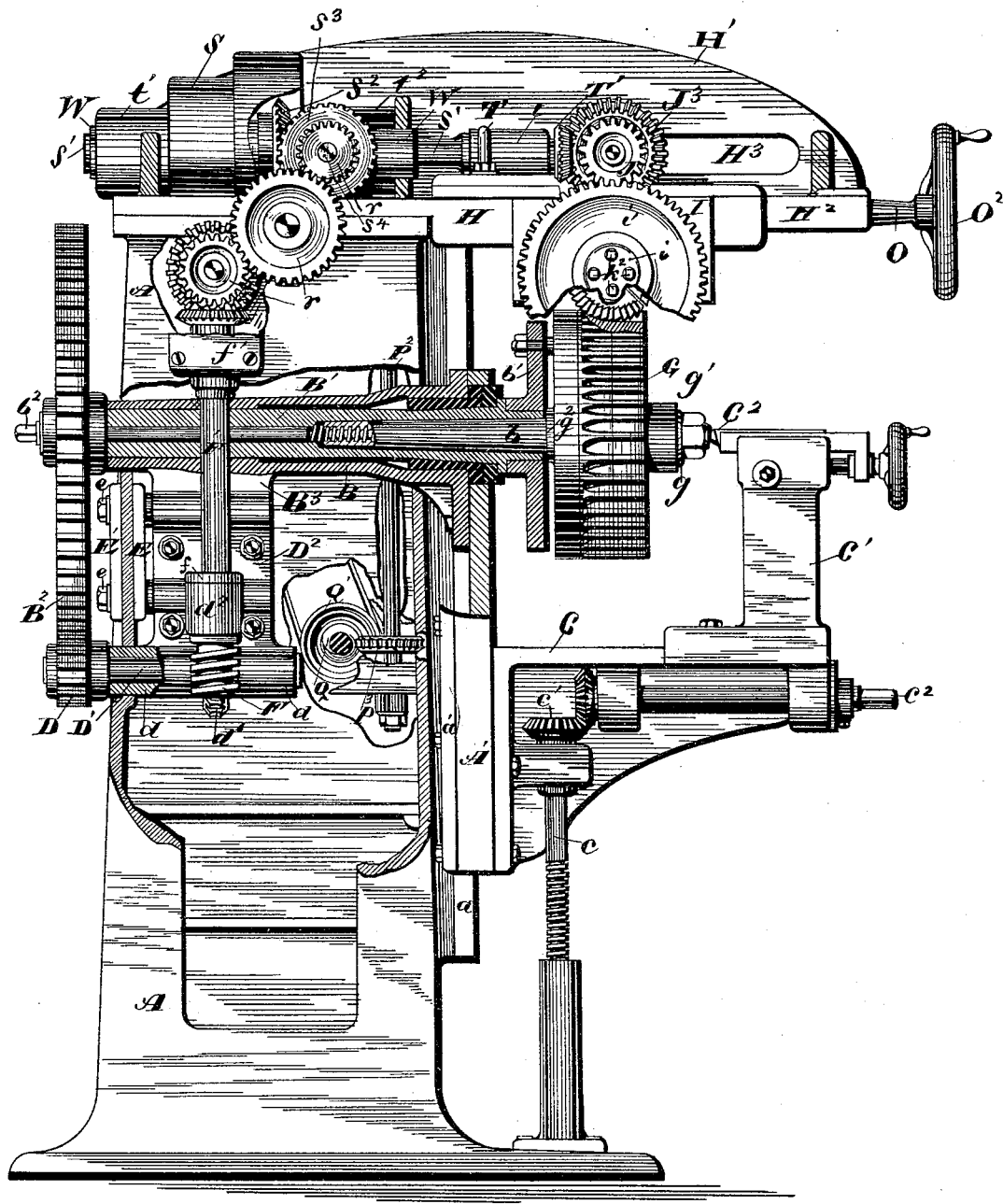

(No Model.) 4 Sheets—Sheet 1.

A. SWASEY.
GEAR CUTTING MACHINE.

No. 327,037. Patented Sept. 29, 1885.

WITNESSES

INVENTOR
Ambrose Swasey
by Leggett & Leggett
Attorneys (No Model.) 4 Sheets—Sheet 2.
A. SWASEY.
GEAR CUTTING MACHINE.
No. 327,037. Patented Sept. 29, 1885.
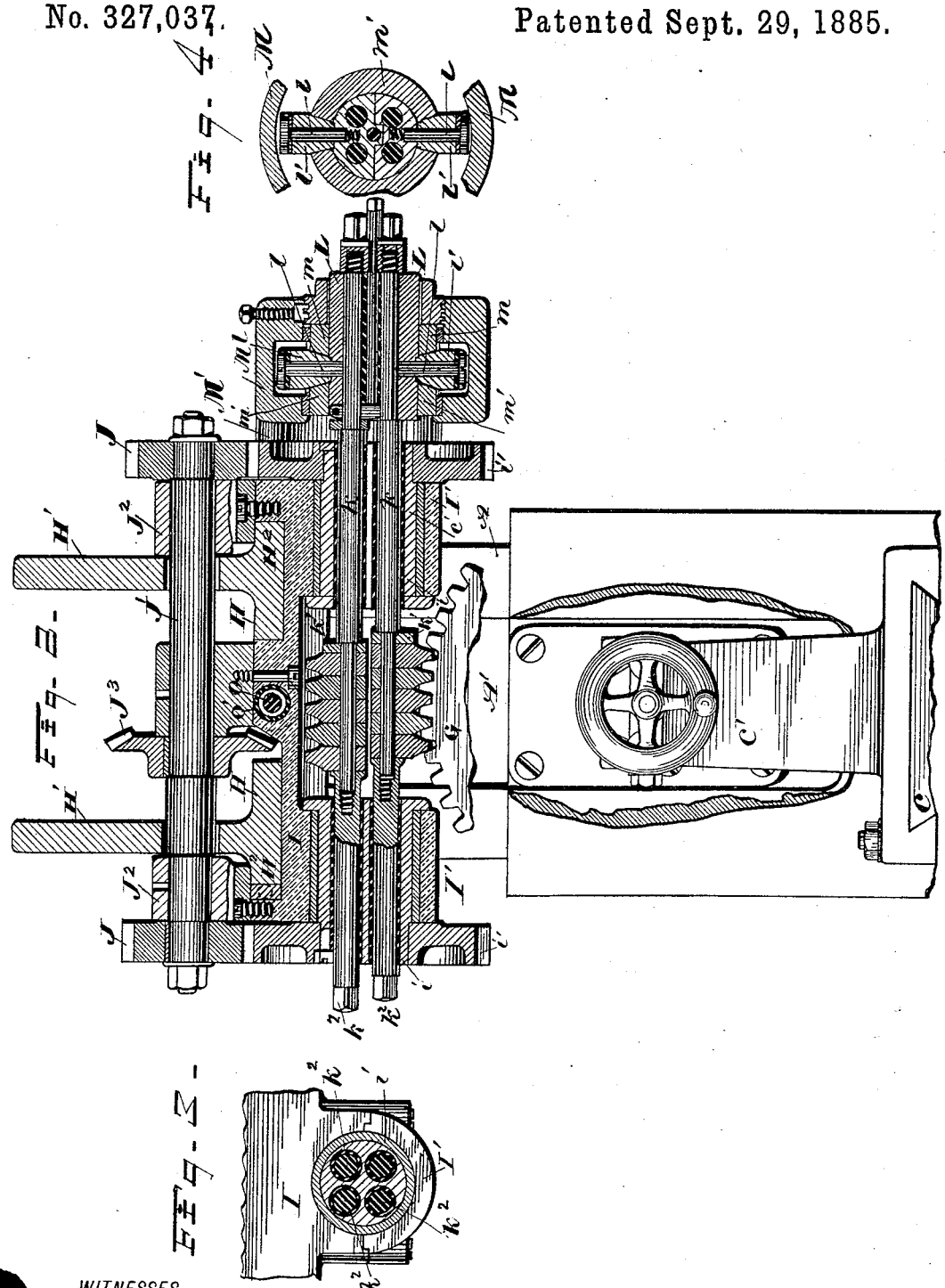
WITNESSES
INVENTOR
Ambrose Swasey.
by
Leggett & Leggett.
Attorneys (No Model.)  4 Sheets—Sheet 3.

A. SWASEY.
GEAR CUTTING MACHINE.

No. 327,037. Patented Sept. 29, 1885.

WITNESSES
Wm. M. Monroe
Geo. W. King

INVENTOR
Ambrose Swasey,
by
Leggett & Leggett,
Attorneys

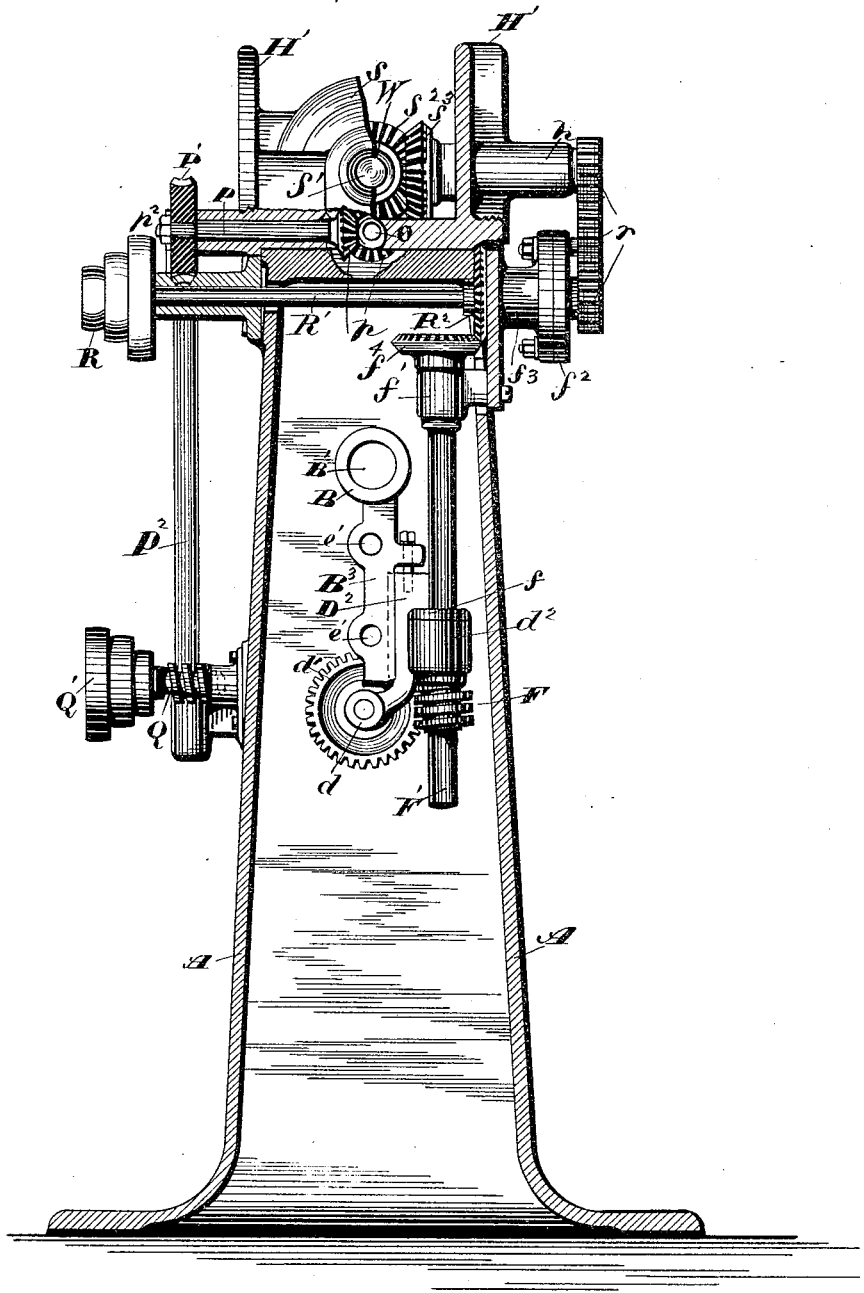

UNITED STATES PATENT OFFICE.

AMBROSE SWASEY, OF CLEVELAND, OHIO.

GEAR-CUTTING MACHINE.

SPECIFICATION forming part of Letters Patent No. 327,037, dated September 29, 1885.

Application filed April 29, 1884. (No model.)

*To all whom it may concern:*

Be it known that I, AMBROSE SWASEY, of Cleveland, in the county of Cuyahoga and State of Ohio, have invented certain new and useful Improvements in Gear-Cutting; and I do hereby declare the following to be a full, clear, and exact description of the invention, such as will enable others skilled in the art to which it pertains to make and use the same.

My invention relates to mechanism for gear-cutting, the object being to provide revolving cutters and suitable actuating mechanism by means of which the cutters are fed slowly across the face of the blank in the process of cutting the teeth, and at the same time the blank is caused to revolve on its axis, and the cutters caused to move endwise with the motion of the blank. A further object is to provide segmental cutters arranged in sections that revolve on a common axis, but have separate endwise movements.

A further object is to provide a cam-movement for reciprocating the sections of cutters, so that each section, while cutting, moves endwise in unison with the blank, and when not cutting moves back endwise to the starting-point, and by the sections acting in turn the cutting is made continuous.

A further object is to provide feed mechanism by means of which the cutters are advanced a given distance across the face of the blank at each revolution of the blank, regardless of the revolutions of the cutters.

A further object is to provide, by means of change-gears, for revolving the cutters a given number of times during one revolution of the blank, and preferably the cutters are given as many revolutions to one of the blanks as there are teeth to be cut in the blank.

With these objects in view my invention consists in the mechanism hereinafter described, and pointed out in the claims.

In what is known as the "interchange-gear" system different gears, of whatever respective diameters, that will fit a given rack, will also fit each other. If, then, the teeth of a rack could be made to act as cutters, and the rack forced sidewise across the face of the blank, so that the teeth of the rack would cut the necessary grooves in the blank to form the teeth thereon, and at the same time the blank should revolve on its axis and the rack move endwise along with the blank, as a rack would move along with an engaging-gear that was revolving, it is evident that the teeth so cut on the blank would fit the teeth on the rack that cut them, and, as aforesaid, different gears cut in this manner would fit each other.

With my improved machine the cutting of gears is substantially the same as the hypothetical process just described. Revolving cutters are provided, the cutting portions of which represent in cross-section the teeth of the rack, and such cutters are fed across the face of the blank, making just such grooves as the supposed cutting-teeth of the rack would have made. The cutters are segments of a circle made preferably in halves, and each half or section, while cutting, moves along endwise with the revolving blank, and when disengaged from the blank moves back endwise to the starting-point, while another section continues the cutting, and is in turn moved back ready for another cutting engagement.

Figure 5:
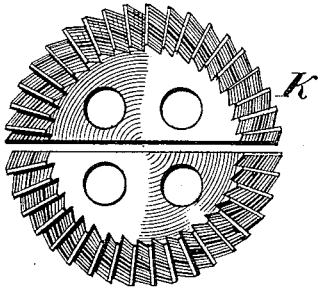
Figure 6:
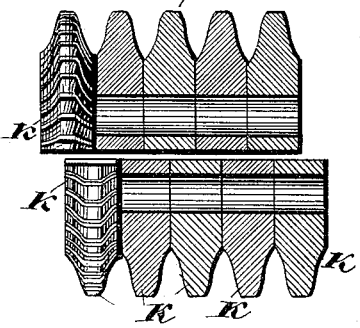
Figure 7:
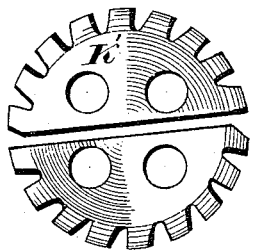
Figure 8:
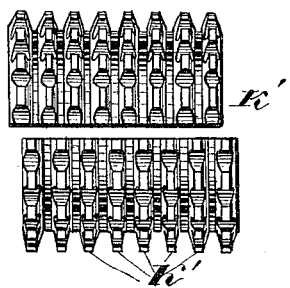
Figure 9:
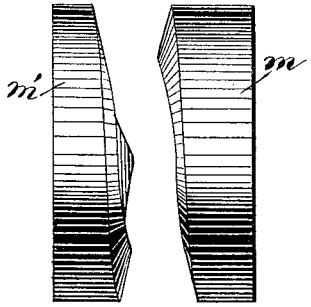

In the accompanying drawings, Figure 1 is a side elevation, partly in section, of my improved gear-cutting engine with portions of the front wall broken away to show the internal construction, and a portion of the rear wall broken to show the mechanism on the back side of the machine. Fig. 2 is a front-end elevation with the upper portion in section. Fig. 3 is a view, partly in elevation and partly in section, of a portion of the machine, and Fig. 4 a vertical section in detail. Fig. 5 is a side elevation of a bisected cutter. Fig. 6 shows a set of five bisected cutters arranged in sections, the left-hand cutter in elevation, and the remaining four in section. Fig. 7 is a side elevation of a cutter with different teeth from those shown in Fig. 5. Fig. 8 is a side elevation of a series of eight cutters of the kind shown in Fig. 7, and arranged in two sections. Fig. 9 is a side elevation of the cams that reciprocate the cutters. Fig. 10 shows a transverse vertical section of the supporting-frame, and in elevation the head and portions of the mechanism as seen from the rear end.

A represents a supporting frame or column, provided with the vertical ways $a$, on which operates the slide A', that is provided with suitable gibs, $a'$. To this slide is bolted on one side the sleeve B, in which is journaled the live-spindle B' and on the other side the bracket C, that supports the tail-stock C', with the dead-center $C^2$. The screw $c$, by means of the engaging-gears $c'$, is actuated from the outer end of the shaft $c^2$, and the bracket C, the slide A, and the sleeve B and attachments are vertically adjusted thereby.

In Fig. 1 one side brace of the bracket C is broken away to show the manner of supporting the screw and shaft $c^2$ from the bracket. The frame A has openings of some length on either end, through which pass the spindle B' and other parts that are moved by the screw $c$.

The spindle B' is provided in the usual manner with the live-center $b$, and some driving device—usually a face-plate, $b'$—and may have a rod, $b^2$, extending outside of the spindle, as shown, and the inner end provided with a thread engaging a thread in the live-center, and by means of which the live-center $b$ may be backed out or drawn into the spindle. The live-center extends some distance beyond the spindle, and the forward end embraces the dead-center $C^2$, and is supported thereby, and this projecting part forms a mandrel on which the blanks G, one or more at a time, are mounted, and are pressed firmly by the nut $g$ and sleeve $g'$ against the collar $g^2$, by means of which the blank revolves with the live-center and spindle, aided by the driver $b'$, when necessary. On the spindle B' is secured the gear $B^2$, engaging the pinion D, that is secured to the shaft D', on which is mounted the worm-gear $d'$, engaging the worm F, that slides on and is driven by the vertical shaft F'. The sleeve B has a pendent arm, $B^3$, to which is secured the part $D^2$, that is provided with the box $d$ for the shaft D', and with the box $d^2$, in which is journaled the hub of the worm F. The upper end of this hub has an adjustable collar, $f$, preferably screwed onto the hub, by means of which the lost end motion of the worm may be taken up. The worm and shaft F and F' are provided in the usual manner with a feather in the one and a groove in the other. The shaft F' is journaled above in the box $f'$, and provided with suitable collars to hold it endwise. The lower end of the shaft is only supported by the said worm. By this arrangement of parts motion is transmitted from the gearing above to the spindle B', in whatever vertical position the spindle and connected parts may be adjusted by the screw $c$. E and E' are plates that extend across the opening in the frame A, and embrace the edges thereof, and are pressed together by the bolts $e$, forming a clamp. The inner ends of these bolts are blanks, and extend some distance into the holes $e'$ of the part $B^3$, and when the parts have been adjusted and the plates clamped onto the frame A, these blanks act as steady-pins to prevent vibration of the sleeve B and attachments.

H is an overhanging head bolted to the frame A and strengthened by the ribs H'. The bottom and outer edges of the overhanging part form ways $H^2$, on which slides the frame I, that supports the cutters and attachments.

In Fig. 1 one rib is broken away to show the mechanism located between the ribs. The frame I has pendent boxes I' on either end, in which are journaled the cylindrical spindle $i$, the outer ends of which project beyond the boxes, and have respectively attached the gears $i'$, that engage the pinions J on the shaft J', and by means of which the two spindles, $i$, revolve in unison. The shaft J' is journaled in the boxes $J^2$, that are attached to the frame I. The shaft J' is provided with the beveled gear $J^3$, that engages a gear, T', on the driving-shaft hereinafter described. The shaft J' passes through the openings $H^3$ in the ribs H'. (Shown more clearly in Fig. 1.) The cutters, of which two kinds are shown, K and K', are first turned to suitable shape, and, preferably, four holes are bored of equal diameter and an equal distance from and parallel with the axis of the cutter, and equidistant apart. The cutters are then severed with a narrow tool, so that when the severed parts or segments are in position to form a circle, they are slightly separated, as shown in Figs. 5 and 7; or each segment may be made separately. The cutters K have to be turned up separately in order to dress the teeth, and are then placed together in series, as shown in Figs. 2 and 6. The cutters K may be turned up in a block, and then bisected, as shown in Fig. 8. The cutters are placed in series on the small ends of the rods $k$, that fit snugly in the holes in the cutters. The right-hand cutter abuts against the shoulder of the rod $k$ or against an intervening washer, $k'$, if preferred. The left-hand end of the rods $k$ screw into the ends of the rods $k^2$ until the latter press against the left-hand cutter or an intervening washer. The outer ends of these rods are square, so as to engage a wrench or crank by means of which the cutter may be firmly secured. The rods $k$ and $k^2$ pass through holes in the respective spindles $i$, having an easy fit therein so that the rods may be slid endwise. The two sections of cutters have therefore an axis in common, and are revolved by the spindles $i$, and, at the same time, each section of the cutters being provided, as aforesaid, with with its two sets of rods, may be reciprocated independently of the other section, the rods, as aforesaid, sliding in their respective bearings in the spindles $i$. The blanks G, as aforesaid, revolve slowly with the live-spindle, and a section of cutters, while engaging the blank in cutting the same, is carried along with it in the manner that a rack would move along with an engaging gear, except that the cutters are not moved by the blank, but by mechanism hereinafter described. When, by the revolving of the cutters, one section is free from its engagement with the blank, it is moved back endwise to the place of starting, while the other section takes its place in cutting.

The mechanism for reciprocating the sections of cutters will next be described.

A divided cylindrical block, L, provided with suitable holes, is secured on the rods $k$, concentric with the cutters, and so arranged that each half of the block engages the rods that secure a section of cutters. Each half of the block L is provided with a stud, $l$, set radially and opposite each other, and on which are journaled, respectively, the rollers $l'$, that operate between the cams $m$ and $m'$. These cams are secured in an annular recess in the head M, that is attached by the arm M' to the frame I. The faces of these cams for about three-quarters of the way around have lead like the thread of a screw and substantially equal to the pitch of the teeth to be cut on the blank. Around the remaining quarter the faces of the cams have each a quick reverse curve to the place of starting. For example, if the teeth have a half-inch pitch, the pitch of the screw part of the cam would be one-half inch if continued around the cam; but as it extends only three-quarters of the way around the cam the throw of the cam in each direction will be only three-eighths of an inch.

The arrangement of parts is such that when one of the rollers $l$ is engaging the screw part of the cams the section of the cutters being reciprocated by this roller is cutting; but when this roller reaches the reverse curve of the cams its section will have passed from its engagement with the blank and is free to be moved back to the starting-point. As the screw part of the cams extends, as aforesaid, more than half-way around the cams, the one roller will engage this part before the other roller has left it. This is necessary from the fact that as the two sections of the cutters are only slightly separated, the rear of the one section will continue to engage the blank some time after the front of the other section has commenced its work. The cutters are slowly advanced across the face of the blank by means of the feed-screw O, that engages a nut, O', in the sliding frame I. The forward end of the screw O is provided with a hand-wheel, $O^2$, for moving the sliding frame I when the feed is thrown out, and the rear end is connected by the bevel-gears $p$ with the shaft P, that has attached the worm-gear P', engaging a worm, $p^2$, on the vertical shaft $P^2$. The lower end of this shaft has the worm-gear $P^3$, (shown in Fig. 1,) that engages the worm Q on the same shaft with the cone Q', that is connected by a belt with the cone R on the shaft R'. On this shaft is the gear $R^2$, engaging the gear $f^4$ of the shaft F', that conveys motion to the live-spindle already described.

It will be seen that the feed mechanism is actuated by the shaft from which power is transmitted to the live-spindle, and therefore the desired feed is had for the cutters for each revolution of the blank. The shaft R' extends through the hub $f^3$, to which is attached the arm $f^2$, that supports the change-gears $r$, that are of the usual construction.

The shaft S' in front is journaled in the box $t$, and is provided with the collar T on the back side of the box and the gear T' on the front side, by means of which the shaft moves endwise with the movement of the frame I.

The gear T' engages the gear $J^3$ already described. The rear end of the shaft S' slides through the sleeve W, that is journaled in the boxes $t$ and $t'$.

The sleeve and shaft are provided in the usual manner with a groove in the one and a feather in the other, by means of which they are made to revolve together.

The driving-cone S and the gear $S^2$ are mounted on the sleeve W. The gear $S^2$ engages the gear $S^3$ on the shaft $S^4$, that is journaled in the box $h$, and by means of which motion is transmitted to the change-gears $r$.

The gears $J^3$, $S^2$, and $R^2$ may be reversed on their respective shafts, and be made to revolve their respective engaging gears in either direction, as may be required. For instance, these gears in Fig. 1 are shown in a reverse position from those shown in Figs. 2 and 10.

The relative motions of the driving-shaft and cutters are positive, and no provision is made for changing them, while the motion of the blank by means of the change-gears is so regulated that the blank advances one tooth with each revolution of the cutters.

As aforesaid, the throw of the cam forward, and consequently the movement of each section of the cutters forward, is about three-fourths of the pitch of the teeth, and we will suppose, as before, that the pitch is one-half inch; but some clearance must be allowed each section both before and after its backward movement, and during a portion of the time that the one section is cutting the other section is cutting also, and the result is the blank is advanced one tooth for each revolution of the entire cutter. The blank therefore must make one revolution while the cutters revolve as many times as there are teeth to be cut in the blank.

One series of segmental cutters forming one section of cutters may be used alone, and instead of being about one-half of a circle, as shown in Figs. 5, 6, 7, and 8, it may be less than that portion of a circle or enough less than a whole circle to allow the cutters to become disengaged from the revolving blank and be moved back to the place of starting; but in such cases the cutting would not be continuous, and therefore should not give as correct results; also, there may be more than two sections of cutters, but this would only add complication to the mechanism without any benefit accuring. Many of the details of construction are omitted for the reason that much of the mechanism employed is well known and in common use in a variety of machines.

When a set of cutters and corresponding cams have been prepared for a given pitch, gears of any number of teeth that is practicable to have in a gear may be cut, and they will all run correctly together.

I do not here claim, broadly, any process, *per se*, for making spur-gear wheels, as I have made such a process and claims thereof the subject of a separate application.

What I claim is—

1. In a gear-cutting engine, a series of revolving cutters provided with slides and actuating mechanism for moving the cutters endwise at substantially the same speed as the pitch-line of the revolving blank in which the teeth are to be cut and in the same direction, substantially as set forth.

2. In a gear-cutting engine, a series of revolving segmental cutters provided with slides and actuating mechanism for moving the cutters endwise at substantially the same speed as the pitch-line of the revolving blank in which the teeth are to be cut and in the same direction until disengaged therefrom, and then moving said cutters back in the opposite direction to the place of starting, as set forth.

3. In a gear-cutting engine, the combination of two series of segmental cutters arranged in two longitudinal sections and revolving on a common axis, each section provided with slides and actuating mechanism for independently reciprocating the several sections.

4. In a gear-cutting engine, the combination, with a series of cutters, of the rods $k$ and $k^2$, as shown, adapted to fill the triple office of holding the cutters firmly in place, acting as slides for reciprocating the cutters, and also as drivers for revolving them, substantially as set forth.

5. In a gear-cutting engine, the combination, with a series of cutters mounted on sliding rods, of revolving spindles provided with holes that act as ways for the sliding rods, and provided with suitable gearing by means of which the spindles are made to revolve and act as a driver for the said rods and cutters, substantially as set forth.

6. In a gear-cutting engine, the combination of cutters, reciprocating rods, and the divided blocks mounted on the reciprocating rods, the parts being so arranged that each section of the blocks is attached to the rods that engage a section of the cutters, and each section of said block being provided with a stud and roller adapted to engage cams for reciprocating the cutters, substantially as set forth.

7. In a gear-cutting engine, the combination, with a series of cutters mounted on reciprocating rods and provided with suitable connecting mechanism, of cams adapted to reciprocate the cutters and provided with a screw-lead that moves the cutters in the direction of the revolving blank, said lead being substantially equal to the pitch of the teeth to be cut in the blank and extending so much of the way around the cam as is necessary to advance a section of the cutters during its engagement with the blank, the remaining portion of the distance around the cam having a shape suitable for moving the cutters in an opposite direction back to the place of starting, substantially as set forth.

In testimony whereof I sign this specification in the presence of two witnesses this 21st day of April, 1884.

AMBROSE SWASEY.

Witnesses:
CHAS. H. DORER,
ALBERT E. LYNCH.